US012602861B2

(12) United States Patent
Qiu

(10) Patent No.: US 12,602,861 B2
(45) Date of Patent: Apr. 14, 2026

(54) IMAGE PROCESSING METHOD, IMAGE PROCESSING DEVICE AND COMPUTER READABLE STORAGE MEDIUM

(71) Applicant: GOERTEK INC., Weifang (CN)

(72) Inventor: Xudong Qiu, Weifang (CN)

(73) Assignee: GOERTEK INC., Weifang (CN)

( * ) Notice: Subject to any disclaimer, the term of this patent is extended or adjusted under 35 U.S.C. 154(b) by 231 days.

(21) Appl. No.: 18/474,285

(22) Filed: Sep. 26, 2023

(65) Prior Publication Data

US 2024/0020913 A1 Jan. 18, 2024

Related U.S. Application Data

(63) Continuation of application No. PCT/CN2021/129157, filed on Nov. 6, 2021.

(30) Foreign Application Priority Data

Jul. 22, 2021 (CN) .......................... 202110833918.4

(51) Int. Cl.
G06T 15/20 (2011.01)
G06F 3/01 (2006.01)
(52) U.S. Cl.
CPC .............. G06T 15/20 (2013.01); G06F 3/012 (2013.01)
(58) Field of Classification Search
CPC ................................. G06T 15/20; G06F 3/012
See application file for complete search history.

(56) References Cited

U.S. PATENT DOCUMENTS

2017/0243324 A1 8/2017 Mierle et al.
2021/0390782 A1 12/2021 Ohashi et al.

FOREIGN PATENT DOCUMENTS

| CN | 105892683 A | 8/2016 | |
|----|-------------|--------|--|
| CN | 106683034 A | 5/2017 | |
| CN | 106919360 A | * 7/2017 | .............. G06T 5/50 |
| CN | 108921951 A | 11/2018 | |
| CN | 109242944 A | 1/2019 | |
| CN | 109819232 A | 5/2019 | |
| CN | 109863538 A | 6/2019 | |

(Continued)

OTHER PUBLICATIONS

International Search Report from International Application No. PCT/CN2021/129157 mailed Apr. 15, 2022.

*Primary Examiner* — Xin Sheng
(74) *Attorney, Agent, or Firm* — Shih IP Law Group, PLLC

(57) ABSTRACT

The disclosure discloses an image processing method, an image processing device and a computer readable storage medium. The image processing method comprises: performing a first rendering process on a left eye image and a right eye image during a first time period; performing a second rendering process on the left eye image obtained by the first rendering process during a second time period; performing a second rendering process on the right eye image obtained by the first rendering process during a third time period; performing an asynchronous time warping on the left eye image by the second rendering process during a fourth time period; performing the asynchronous time warping on the right eye image by the second rendering process during a fifth time period. The disclosure can reduce time delay during the rendering process and thereby reducing the user's dizzy feeling.

20 Claims, 4 Drawing Sheets

(56)         References Cited

FOREIGN PATENT DOCUMENTS

| | | | | | |
|---|---|---|---|---|---|
| CN | 109920040 | A | | 6/2019 | |
| CN | 110488977 | A | | 11/2019 | |
| CN | 111586391 | A | | 8/2020 | |
| CN | 112230776 | A | * | 1/2021 | ........... G06T 15/005 |
| CN | 113596569 | A | | 11/2021 | |
| WO | WO-2018086295 | A1 | * | 5/2018 | ............. G06T 15/00 |

* cited by examiner

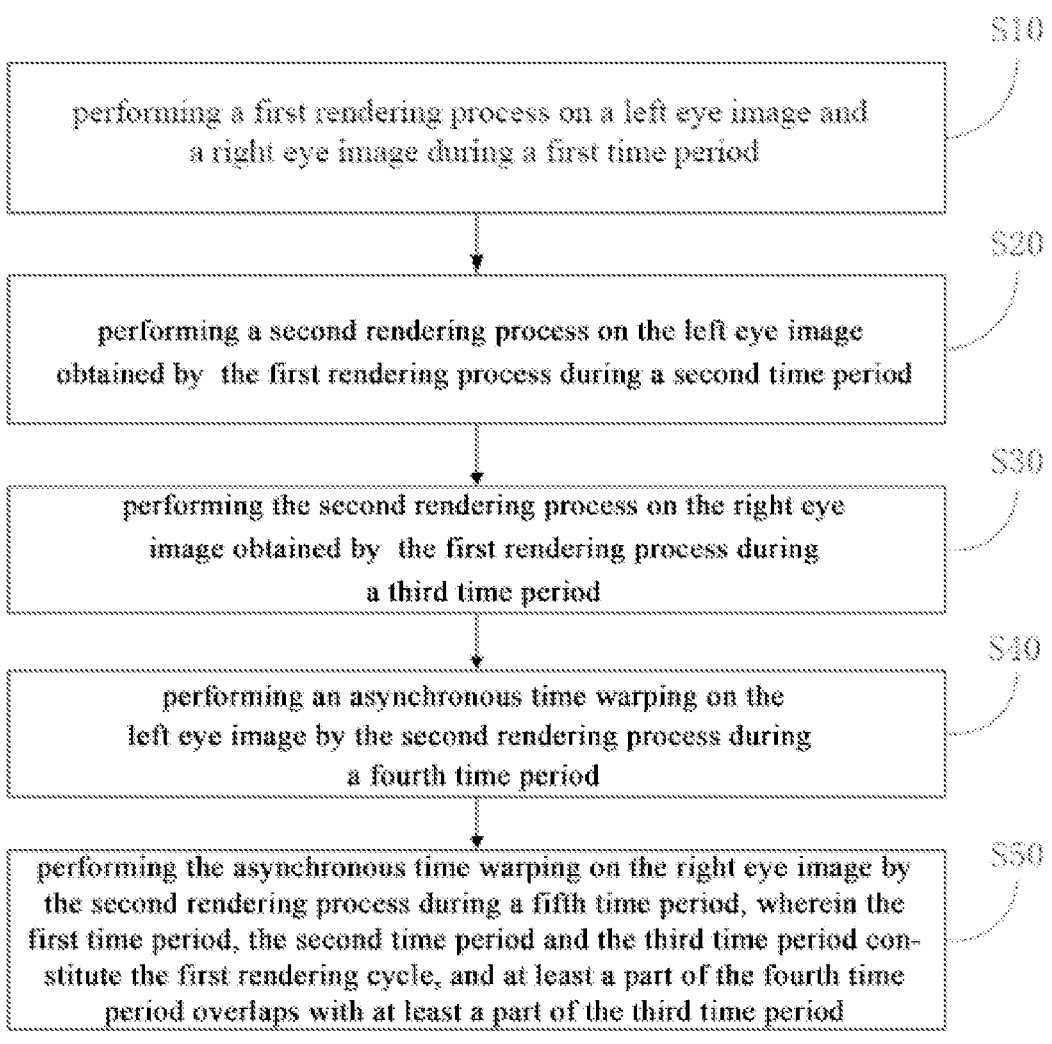

S10 performing a first rendering process on a left eye image and
a right eye image during a first time period

S20 performing a second rendering process on the left eye image
obtained by the first rendering process during a second time period

S30 performing the second rendering process on the right eye
image obtained by the first rendering process during
a third time period

S40 performing an asynchronous time warping on the
left eye image by the second rendering process during
a fourth time period

S50 performing the asynchronous time warping on the right eye image by
the second rendering process during a fifth time period, wherein the
first time period, the second time period and the third time period con-
stitute the first rendering cycle, and at least a part of the fourth time
period overlaps with at least a part of the third time period

Fig. 2

IMAGE PROCESSING METHOD, IMAGE PROCESSING DEVICE AND COMPUTER READABLE STORAGE MEDIUM

The disclosure claims the priority of Chinese patent application filed in the Chinese Patent Office on Jul. 22, 2021, with application No. 202110833918.4 and with the title of "image processing method, image processing device and computer readable storage medium", and the entire content thereof is incorporated to the disclosure by reference.

TECHNICAL FIELD

The disclosure relates to a technical field of image processing, in particular to an image processing method, an image processing device and a computer readable storage medium.

BACKGROUND

AR/VR refreshes the rendered virtual image to a display apparatus through image rendering technology, and users can experience the effect of virtual reality/augmented reality through the head-mounted display.

As the rendering process takes time, there may be a time delay between the reality and the perception. For example, during the rendering process, the user's head or the headwear apparatus worn by the user may move, resulting in a time delay between the user's head posture information and the image data output by the headwear apparatus.

If the time delay is too large, it will cause dizzy feeling.

SUMMARY

In order to achieve the above purpose, one aspect of the disclosure provides an image processing method, comprising:

performing a first rendering process on a left eye image and a right eye image during a first time period;

performing a second rendering process on the left eye image obtained by the first rendering process during a second time period;

performing a second rendering process on the right eye image obtained by the first rendering process during a third time period;

performing an asynchronous time warping on the left eye image by the second rendering process during a fourth time period;

performing the asynchronous time warping on the right eye image by the second rendering process during a fifth time period, wherein the first time period, the second time period and the third time period constitute a first rendering cycle, and at least a part of the fourth time period overlaps with at least a part of the third time period.

Optionally, a sum value of times of the first time period and the second time period is greater than a half of the first rendering cycle.

Optionally, performing an asynchronous time warping on the left eye image by the second rendering process comprises:

acquiring a first head posture information of a user; and performing the asynchronous time warping on the left eye image by the second rendering process according to the first head posture information.

Optionally, performing a first rendering process on a left eye image and a right eye image comprises:

acquiring image data from a first image buffer;

acquiring the left eye image and the right eye image from the image data according to a preset condition; and performing the first rendering process on the left eye image and the right eye image.

Optionally, performing an asynchronous time warping on the right eye image by the second rendering process comprises:

acquiring a second head posture information of a user;

performing the asynchronous time warping on the right eye image by the second rendering process according to the second head posture information.

Optionally, performing a second rendering process on the left eye image obtained by the first rendering process comprises:

acquiring a first preset posture information corresponding to the left eye image obtained by the first rendering process; and performing the second rendering process on the left eye image obtained by the first rendering process according to the first preset posture information.

Optionally, performing a second rendering process on the right eye image obtained by the first rendering process comprises:

acquiring the second preset posture information corresponding to the right eye image obtained by the first rendering process; and performing the second rendering process on the right eye image obtained by the first rendering process according to the second preset posture information.

Optionally, before performing an asynchronous time warping on the left eye image by the second rendering process, the method further comprises:

rendering the left eye image by the second rendering process to a second image buffer.

Optionally, before performing the asynchronous time warping on the right eye image by the second rendering process, the method further comprises:

rendering the right eye image by the second rendering process to a third image buffer.

Optionally, the image processing method further comprises: sending the left eye image by the asynchronous time warping and the right eye image by the asynchronous time warping to a display respectively, for displaying by the display.

Optionally, head posture information comprises at least one of the following:

position information indicating position information of the user's head or a VR apparatus worn by the user; and orientation information indicating orientation information of the user's head or the VR apparatus worn by the user.

In addition, in order to achieve the above purpose, another aspect of the disclosure further provides an image processing device, comprising a memory, a processor, and an image processing program stored on the memory and executed by the processor, and the processor is configured to execute the image processing program to perform the steps of the image processing method described above are implemented.

In addition, in order to achieve the above purpose, another aspect of the disclosure further provides a computer readable storage medium in which an image processing program is stored, and the image processing program is configured to be executed by a processor to perform the steps of the image processing method described above are implemented.

The disclosure provides an image processing method, which performs a first rendering process on the left eye image and the right eye image during the first time period, performs the second rendering process on the left eye image obtained by the first rendering process during the second time period, performs the second rendering process on the right eye image obtained by the first rendering process during the third time period, performs the asynchronous time warping on the left eye image by the second rendering process during the fourth time period, and performs the asynchronous time warping on the right eye image by the second rendering process during the fifth time period. The embodiment of the disclosure can reduce the time delay during the rendering process and thereby reduce the user's dizzy feeling by performing the first rendering process on the left eye image and the right eye image, and starting the asynchronous time warping of the left eye image and the asynchronous time warping of the right eye image at a certain time.

BRIEF DESCRIPTION OF THE DRAWINGS

FIG. 2 is a schematic flow chart of a first embodiment of an image processing method of the disclosure;

The implementations, functional features and advantages of the purpose of the disclosure will be further described with reference to attached drawings in combination with the embodiments.

DETAILED DESCRIPTION OF EMBODIMENTS

It should be understood that the embodiments described herein are only used to explain the disclosure, not to define the disclosure.

The main solution of the embodiment of the disclosure is to perform a first rendering process on a left eye image and a right eye image during a first time period, perform a second rendering process on the left eye image obtained by the first rendering process during a second time period, perform a second rendering process on the right eye image obtained by the first rendering process during a third time period; perform an asynchronous time warping on the left eye image by the second rendering process during a fourth time period; and perform the asynchronous time warping on the right eye image by the second rendering process during a fifth time period, wherein the first time period, the second time period and the third time period constitute a first rendering cycle, and at least a part of the fourth time period overlaps with at least a part of the third time period.

In some cases, when a graphics engine is rendering graphics of a frame, the user's head or the VR headwear apparatus worn by the user may move, which causes the position and/or orientation information of the user's head to be inaccurate when outputting the frame to the display, and thereby resulting in dizzy feeling of the user.

Therefore, the disclosure performs the first rendering process on the left eye image and the right eye image during the first time period, performs the second rendering process on the left eye image obtained by the first rendering process during the second time period, performs the second rendering process on the right eye image obtained by the first rendering process during the third time period, performs the asynchronous time warping on the left eye image by the second rendering process during the fourth time period, and performs the asynchronous time warping on the right eye image by the second rendering process during the fifth time period. Thus, the embodiment of the disclosure can reduce the time delay during the rendering process and thereby reduce the user's dizzy feeling by performing the first rendering process on the left eye image and the right eye image, and starting the asynchronous time warping of the left eye image and the asynchronous time warping of the right eye image at a certain time.

Further, by performing the first rendering process on the left eye image and the right eye image, the rendering time of the right eye image can be accelerated, so that the asynchronous time warping of the left eye image can be delayed. In this way, rendering waste can be prevented, more real-time frames can enter the display, and the user's dizzy feeling can be reduced.

Figure 1:
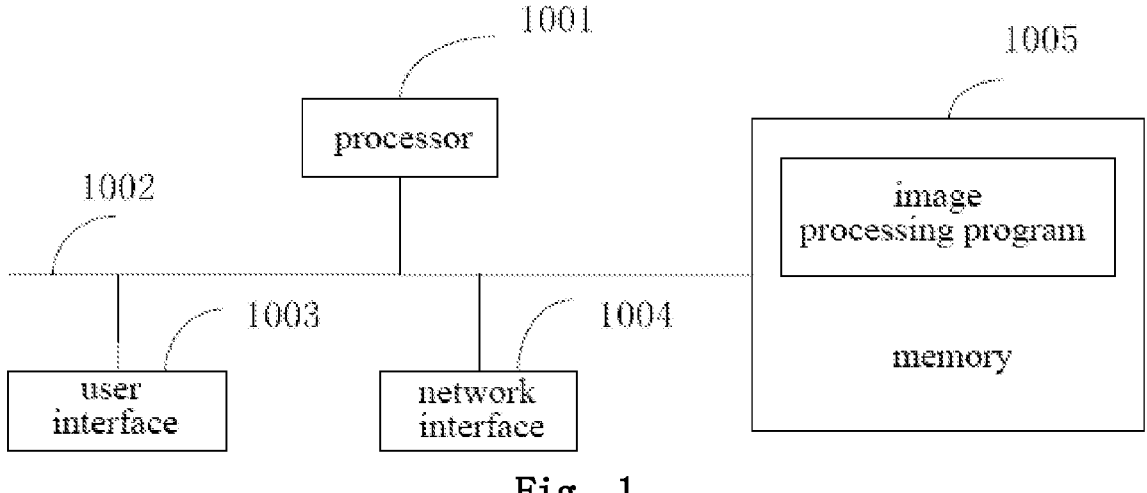
FIG. 1 is a structural schematic diagram of a terminal of a hardware operation environment according to an embodiment of the disclosure.

As shown in FIG. 1, FIG. 1 is a structural schematic diagram of a terminal apparatus of a hardware operation environment according to an embodiment of the disclosure.

As shown in FIG. 1, the terminal apparatus may include: a processor 1001, such as CPU; a network interface 1004; a user interface 1003; a memory 1005; and a communication bus 1002. Wherein, the communication bus 1002 is used to realize connection and communication between these components. The user interface 1003 may include a display screen (Display), an input unit such as a keyboard, and optionally, the user interface 1003 may also include a standard wired interface and a wireless interface. Optionally, the network interface 1004 may include a standard wired interface and a wireless interface (such as WI-FI interface). The memory 1005 may be a high-speed RANI memory, and also may be a stable memory (for example, a non-volatile memory), such as a disk memory. Optionally, the memory 1005 may also be a storage device independent of the processor 1001 described above.

Those skilled in art may understand that the structure of the terminal apparatus shown in FIG. 1 does not constitute a definition of the terminal apparatus, and may include more or fewer components than that shown in FIG. 1, or some components may be combined or it may have different component arrangements.

As shown in FIG. 1, the memory 1005 as a computer readable storage medium may include an image processing program.

In the terminal apparatus shown in FIG. 1, the network interface 1004 is mainly used for data communication with a background server; the user interface 1003 is mainly used for data communication with a client side (a user side); and the processor 1001 may be used to call the image processing program in the memory 1005 and performs the following operations:

performing a first rendering process on a left eye image and a right eye image during a first time period;

performing a second rendering process on the left eye image obtained by the first rendering process during a second time period;

performing a second rendering process on the right eye image obtained by the first rendering process during a third time period;

performing an asynchronous time warping on the left eye image the second rendering process during the fourth time period; and performing the asynchronous time warping on the right eye image by the second rendering process during a fifth time period, wherein the first time period, the second time period and the third time period constitute the first rendering cycle, and at least a part of the fourth time period overlaps with at least a part of the third time period.

Referring to FIG. 2, FIG. 2 is a schematic flow chart of a first embodiment of an image processing method of the disclosure.

The embodiment of the disclosure provides an image processing method. It should be noted that although the logical sequence is shown in the flow chart, in some cases, the steps shown or described can be performed in a sequence different from that herein.

The image processing method of the present embodiment operates on the terminal apparatus side, and includes the following steps:

Step S10, performing a first rendering process on a left eye image and a right eye image during a first time period.

It should be noted that, in an ideal situation, before the rendering engine sends the display content to the user, the rendering engine uses the pre-measured real-time head posture information (such as orientation information and position information). However, in an actual situation, since the rendering process takes time, it will cause a time delay between the reality and the perception. At this time, the pictures seen by the user may shake, that is, the apparatus cannot render the picture corresponding to the head movements synchronously, and when the picture shakes, dizzy feeling will be naturally generated for people.

Based on above problems, time warping may be used to adjust (for example, rotate or regulate) the image or the frame to calibrate the head movement that occurs after (or in the meanwhile) the image is rendered, thereby reducing the delaying of the perception. When the user's head position changes, time warping may be applied to convert the displayed image to be consistent with the new perspective. Wherein, the time warping refers to collecting a large number of gyroscope data, and predicting the rotation and position which might be occurred for the user's head after 16.66 ms in a case of having enough samples, and then rendering according to the predicted data. The time warping includes a synchronous time warping and an asynchronous time warping. The disclosure uses the asynchronous time warping, and the asynchronous time warping refers to performing in parallel (i.e. asynchronous) with the rendering thread on another thread. For example, ATW (Asynchronous Time Warping) thread can generate a new time warping frame from the latest frame by which the rendering thread is completed. One of advantages of ATW is that the rendering thread will not be delayed due to the calculations involved in time warping, furthermore, ATW can utilize multiprocessing capabilities of the underlying software and/or hardware platform.

Figure 5:
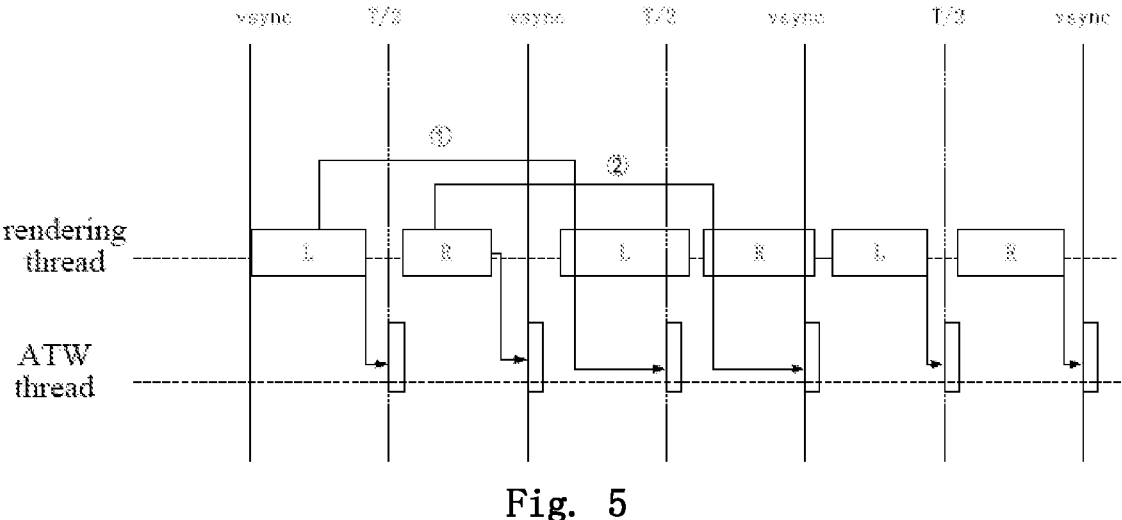
FIG. 5 is a schematic diagram of the original asynchronous time warping processing mechanism.

Referring to FIG. 5, in general, when rendering the left eye image and the right eye image, the VR headwear apparatus renders the left eye image in the first half of T/2 (T refers to the rendering cycle), and then performs the asynchronous time warping on the left eye image while rendering the right eye image, that is, the asynchronous time warping of the left eye image is performed in parallel with the rendering of the right eye image, so as to improve the data processing speed. The prior art is to perform the asynchronous time warping on the left eye image during the T/2 fixedly, and if the rendering is not completed at the T/2, the previous frame will be used to instead of performing the asynchronous time warping, as shown in ① and ② of FIG. 5. However, if the time of rendering the left eye image exceeds T/2, it will be discarded, and the left eye image content rendered exceeding T/2 will be wasted. Based on this problem, the MultiView Rendering function may be used to render the left and right eye images, and the MultiView Rendering function can reduce the number of drawing calls to duplicate objects in the VR application program, thus allowing the GPU to transmit the objects to the left and right eyes in one drawing call, which facilitates to reduce the CPU load, thereby reducing the number of lost frames and optimizing the rendering delaying.

Data loading, mapping, sampling, vertex processing and other operations are required to be performed when rendering the left and right eye images, most of the rendering operations of the left and right eye images are the same. The only difference between the two renderings is that the rendering need to be converted when applied to vertices. Therefore, in order to avoid common processing such as data loading, mapping and the like from being repeatedly performed for the left and right eye images, when rendering the left eye image, image data is obtained from a first image buffer (such as a CPU buffer), the left eye image and the right eye image are obtained from the image data according to preset conditions, and then the first rendering process is performed on the left eye image and right eye image. The first rendering process refers to performing common process on the left eye image and right eye image at the same time, and the common process includes rendering operations such as data loading, mapping, sampling and the like. Wherein, the left eye image and the right eye image are the same image, but due to angle difference, the image contents seen by the left and right eyes are not completely the same. In one embodiment, when the multi view rendering function is started, a structure array is created through an OpenGL (Open Graphics Library) program. The structure array is composed of two elements representing the left eye image and the right eye image respectively, and the structure array is bound to one Frame Buffer Object (FBO), and in the meanwhile the left eye texture buffer and the right eye texture buffer are loaded to the Frame Buffer Object FBO. In this way, when rendering the left eye image, the image frame is loaded from the frame buffer object FBO to the left eye texture buffer (GPU buffer) and the right eye texture buffer (GPU buffer) at the same time, and then the left eye image is obtained in the left eye texture buffer according to the image frame, and the right eye image is obtained in the right eye texture buffer according to the image frame, and the first rendering process is performed on the acquired left eye image and right eye image. Wherein, since the structure array is bound to one frame buffer object, the image driving program only needs to provide a GPU Command Buffer to enable the left and right eyes to share the command buffer, and restart the command buffer in each rendering.

In this embodiment, since the common processing of left and right eye images is performed when rendering the left eye image, the right eye does not need to be by rendering operations such as data loading, mapping, sampling and the like when rendering the right eye image, thus the rendering time of the right eye image is accelerated.

Step S20, performing a second rendering process on the left eye image obtained by the first rendering process during the second time period.

After completing the first rendering process of the left eye image, a second rendering process on the left eye image obtained by the first rendering process during the second time period may be performed, wherein the second rendering process refers to performing the prediction and compensation of the posture of the left eye image. In one embodiment, two image conversion matrices corresponding to the left eye and the right eye are generated according to attributes of two preset virtual cameras respectively, wherein attributes of the virtual camera may include the position of the virtual camera, the orientation of the virtual camera, angle between the two virtual cameras, and the like. The image conversion matrix corresponding to the left eye image obtained by the first rendering process is determined, and the left eye image is by project conversion by using the image conversion matrix of the left eye, so as to project the left eye image into a projection window, that is, performing an image drawing on the left eye image by using the image conversion matrix of the left eye, and the drawn left eye image is rendered to the second image buffer (GPU buffer). In this way, the transformation from 3D coordinates to 2D coordinates is realized.

Step S30, performing a second rendering process on the right eye image obtained by the first rendering process during the third time period.

After completing the first rendering process of the right eye image, a second rendering process on the right eye image obtained by the first rendering process during the third time period may be performed, wherein the second rendering process refers to performing the prediction and compensation of the posture of the right eye image. In one embodiment, two image conversion matrices corresponding to the left eye and the right eye are generated according to attributes of two preset virtual cameras respectively, wherein attributes of the virtual camera may include the position of the virtual camera, the orientation of the virtual camera, angle between the two virtual cameras, and the like. The image conversion matrix corresponding to the right eye image obtained by the first rendering process is determined, and the right eye image is by project conversion by using the image conversion matrix of the right eye, so as to project the right eye image into a projection window, that is, performing an image drawing on the right eye image by using the image conversion matrix of the right eye, and the drawn right eye image is rendered to the third image buffer (GPU buffer). In this way, the transformation from 3D coordinates to 2D coordinates is realized.

Step S40: performing an asynchronous time warping on the left eye image by the second rendering process during the fourth time period.

Figure 6:
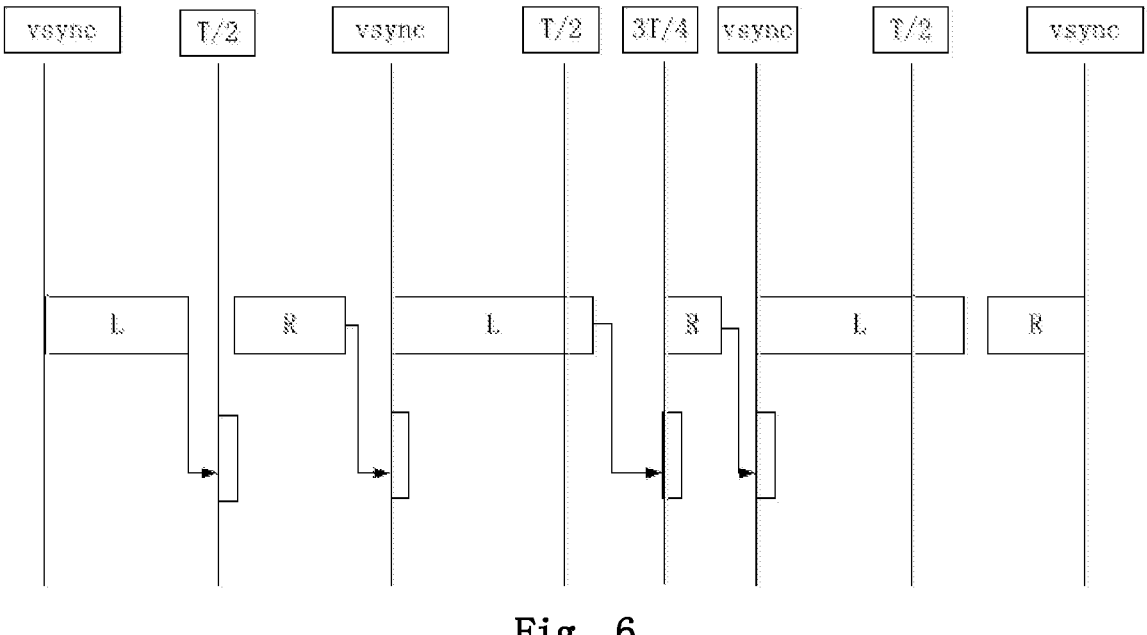
FIG. 6 is a schematic diagram of an asynchronous time warping processing mechanism of the image processing method of the disclosure.

After completing the second rendering process of the left eye image, the asynchronous time warping on the left eye image by the second rendering process during the fourth time period may be performed. In one embodiment, when the time duration of the current rendering cycle reaches the preset time duration, the left eye image by the second rendering process is by the asynchronous time warping, wherein the preset time duration is greater than a half of the rendering cycle. For example, referring to FIG. 6, the preset time duration is 3T/4, and when the time duration of the current rendering cycle reaches 3T/4, the left eye image by the second rendering process is by the asynchronous time warping. Wherein, the preset time duration may be set according to the requirement of the renderer step operation, which is no limit herein. It should be noted that the left eye image is by the asynchronous time warping during T/2, but if the rendering of the left eye image is not finished in T/2, the left eye image rendered after T/2 will be wasted. However, since the rendering time of the right eye image becomes shorter in the disclosure, the time for performing asynchronous time warping on the left eye image can be extended, to ensure the asynchronous time warping of the left eye image after rendering, to avoid rendering waste, and to reduce the dizzy feeling.

After completing the asynchronous time warping of the left eye image, the warped left eye image is rendered to the image buffer, such as a single buffer (a CPU buffer), and the left eye image is transmitted to the display through the image buffer by a MIPI bus for displaying by the display.

Step S50: performing the asynchronous time warping on the right eye image by the second rendering process during the fifth time period, wherein the first time period, the second time period and the third time period constitute the first rendering cycle, and at least a part of the fourth time period overlaps with at least a part of the third time period.

After completing the second rendering process of the right eye image, the right eye image is by the asynchronous time warping during the fifth time period, and the warped right eye image is rendered to the image buffer, such as the single buffer (the CPU buffer), and the right eye image is transmitted to the display through the image buffer by the MIPI bus for displaying by the display. Wherein, the rendering process of the left and right eye images are both executed in the rendering thread, and the ATW processes of the left and right eye images are both executed in the ATW thread.

It should be noted that the image buffer to which the warped left eye image is rendered and the image buffer to which the warped right eye image is rendered may be different image buffers.

Wherein, both of the first time period and the second time period are left eye image rendering time period. As for the left eye image, the rendering of some images are completed during the first time period, and the rendering of all images are completed after the second time period, and the rendering time of the left eye image is sum value of times of the first time period and the second time period. The third time period is the rendering time of the right eye image. Therefore, the first time period, the second time period and the third time period constitute the first rendering cycle together. Since the common rendering operation of the left and right eye images is completed when rendering the left eye image, thus the rendering time of the right eye image is shortened, in the meanwhile the start of the asynchronous time warping of the left eye image can be delayed. Since the start of the asynchronous time warping of the left eye image is delayed, the rendering time of the left eye image becomes longer. Therefore, a sum value of times of the first time period and the second time period is greater than a half of the first rendering cycle. In addition, since the right eye image is also rendered while the asynchronous time warping of the left eye image is performed, at least a part of the fourth time period overlaps with at least a part of the third time period.

The fifth time period described above may be within the second rendering cycle after the first rendering cycle.

The present embodiment uses the MultiView Rendering function to render the left and right eye images, so as to accelerate the rendering time of the right eye image. In this way, the asynchronous time warping of the left eye image can be delayed, so as to ensure the asynchronous time warping of the left eye image after by rendering, to avoid rendering waste, and to reduce the dizzy feeling.

Figure 3:
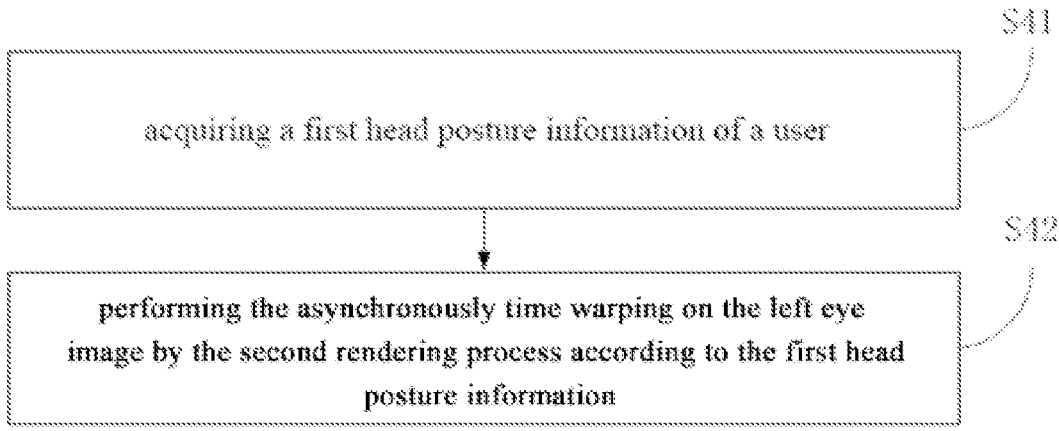
FIG. 3 is a schematic flow chart of an asynchronous time warping of a left eye image by a second rendering process in the image processing method of the disclosure.

Further, referring to FIG. 3, a second embodiment of the image processing method of the disclosure is provided.

The difference between the second embodiment of the image processing method and the first embodiment of the image processing method is that, the step of performing the asynchronous time warping on the left eye image by the second rendering process to output and display the left eye image by asynchronous time warping includes:

step S41, acquiring a first head posture information of a user; and step S42, performing the asynchronously time warping on the left eye image by the second rendering process according to the first head posture information.

When performing the asynchronous time warping on the left eye image by the second rendering process, the first head posture information of the user is acquired. The first head posture information may include information indicating (or recognizing) the head posture, and may include at least one of the position information indicating the user's head or the headwear VR apparatus and the orientation information indicating the user's head or the headwear apparatus. For example, the first head posture information of the user, such as comprising the position information and/or orientation information of the user's head or the VR apparatus worn by the user, may be obtained from the tracking apparatus that tracks the posture of the VR apparatus worn by the user. Wherein, the tracking apparatus may be a part of the headwear VR apparatus, such as IMU, accelerometer, camera or other tracking apparatus, and is used to track the posture of the headwear VR apparatus or the user's head. Then, the rotation direction or position of the user's head is predicted according to acquired first head posture information of the user, and the left eye image by the second rendering process is by the asynchronous time warping according to the predicted rotation direction or position, and the warped left eye image is rendered to the image buffer, such as a single buffer, and the warped left eye image is sent to the display through the image buffering for displaying by the display. For example, the head 6dof quad data is obtained, and a predicted rotation matrix is calculated from the head 6dof quad data, and the left eye image by the second rendering process is processed by using the predicted matrix to obtain the warped (rotated or adjusted) left eye image, and then the warped left eye image is rendered to the image buffer, and the image buffer sends the left eye image to the display through hardware for displaying by the display.

In this embodiment, the left eye image is by time warping (such as rotation or adjustment) to calibrate the head movement that occurs after (or in the meanwhile) the left eye image is rendered, which can reduce the perception delay, thereby reducing the user's dizzy feeling.

Figure 4:
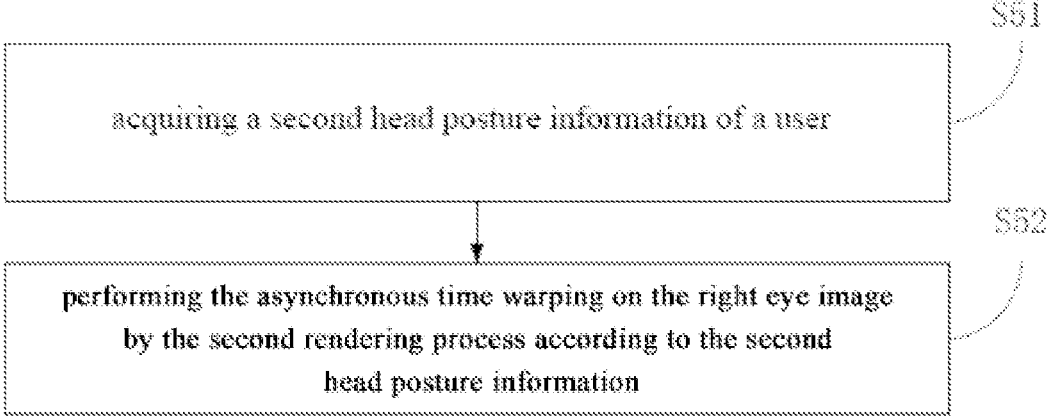
FIG. 4 is a schematic flow chart of the asynchronous time warping of a right eye image by the second rendering process in the image processing method of the disclosure.

Further, referring to FIG. 4, a third embodiment of the image processing method of the disclosure is proposed.

The difference between the third embodiment and the second embodiment of the image processing method is that, the step of performing asynchronous time warping on the right eye image by the second rendering process to output and display the right eye image by asynchronous time warping includes:

step S51, acquiring a second head posture information of the user;

step S52, performing the asynchronous time warping on the right eye image by the second rendering process according to the second head posture information.

When performing the asynchronous time warping on the right eye image by the second rendering process, the second head posture information of the user is acquired. The second head posture information may include information indicating (or recognizing) the head posture, and may include at least one of the position information indicating the user's head or the headwear VR apparatus and the orientation information indicating the user's head or the headwear apparatus. For example, the second head posture information of the user, such as comprising the position information and/or orientation information of the user's head or the VR apparatus worn by the user, may be obtained from the tracking apparatus that tracks the posture of the VR apparatus worn by the user. Wherein, the tracking apparatus may be a part of the headwear VR apparatus, such as IMU, accelerometer, camera or other tracking apparatus, and is used to track the posture of the headwear VR apparatus or the user's head. Then, the rotation direction or position of the user's head is predicted according to acquired second head posture information of the user, and the left eye image by the second rendering process is by the asynchronous time warping according to the predicted rotation direction or position, and the warped right eye image is rendered to the image buffer, such as a single buffer, and the warped right eye image is sent to the display through the image buffer for displaying by the display. For example, the head 6dof quad data is obtained, a predicted rotation matrix is calculated from the head 6dof quad data, and the right eye image by the second rendering process is processed by using the predicted matrix to obtain the warped (rotated or adjusted) right eye image, and then the warped right eye image is rendered to the image buffer, and the image buffer sends the right eye image to the display through hardware for displaying by the display.

In this embodiment, the right eye image is by time warping (such as rotation or adjustment) to calibrate the head movement that occurs after (or in the meanwhile) the right eye image is rendered, which can reduce the perception delay, thereby reducing the user's dizzy feeling.

In addition, the disclosure further provides an image processing device, including a memory, a processor and an image processing program stored in the memory and executed by the processor. The image processing device performs a first rendering process on the left eye image and the right eye image during a first time period, performs the second rendering process on the left eye image obtained by the first rendering process during a second time period, performs the second rendering process on the right eye image obtained by the first rendering process during a third time period, performs an asynchronous time warping on the left eye image by the second rendering process during a fourth time period, and performs the asynchronous time warping on the right eye image by the second rendering process during a fifth time period. The embodiment of the disclosure can reduce the time delay during the rendering process and thereby reduce the user's dizzy feeling by performing the first rendering process on the left eye image and the right eye image, and starting the asynchronous time warping of the left eye image and the asynchronous time warping of the right eye image at a certain time.

Further, by performing the first rendering process on the left eye image and the right eye image, the rendering time of the right eye image can be accelerated, so that the start of the asynchronous time warping of the left eye image can be delayed. In this way, the waste of rendering can be avoided, more real-time frames can enter the display, and the user's dizzy feeling can be reduced.

It should be noted that, the above image processing device may be a hardware module (such as a special processor and an integrated processor), a software function module or an integral machine apparatus (such as VR apparatus, AR apparatus, MR apparatus).

In addition, the disclosure further provides a computer readable storage medium in which an image processing method program is stored. When the image processing method program is executed by the processor, the image processing method described above is implemented.

In this specification, the embodiments are described in parallel or in a progressive manner. The description for each embodiment focuses on the difference from other embodiments. The same or similar parts of the embodiments may be referred to each other. For the device disclosed in the embodiments, since it corresponds to the method disclosed in the embodiments, the description is relatively simple, and the relevant details may be referred to the description of the method parts.

Those skilled in art can also understand that the units and algorithm steps of each example described in combination with the embodiments disclosed herein can be implemented in electronic hardware, computer software, or a combination of the electronic hardware and the computer software. In order to clearly explain the interchangeability of hardware and software, the composition and steps of each example have been generally described in above description in accordance with the functions. Whether these functions are implemented in hardware or software depends on the specific application and design constraint conditions of the technical solution. Those skilled in the art may use different methods for each specific application to realize the described functions, but such implementation should not be considered as going beyond the scope of the disclosure.

It should also be noted that, in the description, relational terms such as the first and second are only used to distinguish one entity or operation from another entity or operation, and do not necessarily require or imply any such actual relationship or order existed between these entities or operations. Moreover, the terms "including", "comprising" or any other variant thereof are intended to cover non-exclusive inclusion, so that a process, method, article or apparatus including a series of elements not only includes those elements, but also includes other elements not explicitly listed, or also includes elements inherent to such process, method, article or apparatus. Without further restrictions, the elements defined by the statement "including a . . . " do not exclude that there are other identical elements in the process, method, article or apparatus including the elements.

What is claimed is:

1. An image processing method, comprising:
   performing a first rendering process on a left eye image and a right eye image during a first time period;
   performing a second rendering process on the left eye image obtained by the first rendering process during a second time period;
   performing a second rendering process on the right eye image obtained by the first rendering process during a third time period;
   performing an asynchronous time warping on the left eye image by the second rendering process during a fourth time period;
   performing the asynchronous time warping on the right eye image by the second rendering process during a fifth time period,
   wherein the first time period, the second time period and the third time period constitute a first rendering cycle, and at least a part of fourth time period overlaps with at least a part of the third time period.

2. The image processing method according to claim 1, wherein a sum value of times of the first time period and the second time period is greater than a half of the first rendering cycle.

3. The image processing method according to claim 1, wherein performing an asynchronous time warping on the left eye image by the second rendering process comprises:
   acquiring a first head posture information of a user; and
   performing the asynchronous time warping on the left eye image by the second rendering process according to the first head posture information.

4. The image processing method according to claim 3, wherein the first head posture information comprises at least one of the following:
   position information indicating position information of the user's head or a VR apparatus worn by the user; and
   orientation information indicating orientation information of the user's head or the VR apparatus worn by the user.

5. The image processing method according to claim 1, wherein performing a first rendering process on a left eye image and a right eye image comprises the following steps:
   acquiring image data from a first image buffer;
   acquiring the left eye image and the right eye image from the image data according to a preset condition; and
   performing the first rendering process on the left eye image and the right eye image.

6. The image processing method according to claim 1, wherein performing the asynchronous time warping on the right eye image by the second rendering process comprises:
   acquiring a second head posture information of a user; and
   performing the asynchronous time warping on the right eye image by the second rendering process according to the second head posture information.

7. The image processing method according to claim 6, wherein the second head posture information comprises at least one of the following:
   position information indicating position information of the user's head or a VR apparatus worn by the user; and
   orientation information indicating orientation information of the user's head or the VR apparatus worn by the user.

8. The image processing method according to claim 1, wherein performing a second rendering process on the left eye image obtained by the first rendering process comprises:
   acquiring a first preset posture information corresponding to the left eye image obtained by the first rendering process; and
   performing the second rendering process on the left eye image obtained by the first rendering process according to the first preset posture information.

9. The image processing method according to claim 1, wherein performing a second rendering process on the right eye image obtained by the first rendering process comprises:
   acquiring a second preset posture information corresponding to the right eye image obtained by the first rendering process; and
   performing the second rendering process on the right eye image obtained by the first rendering process according to the second preset posture information.

10. The image processing method according to claim 1, wherein before performing an asynchronous time warping on the left eye image by the second rendering process, the image processing method further comprises:
   rendering the left eye image by the second rendering process to a second image buffer.

11. The image processing method according to claim 1, wherein before performing the asynchronous time warping on the right eye image by the second rendering process, the image processing method further comprises:

rendering the right eye image by the second rendering process to a third image buffer.

12. The image processing method according to claim 1, wherein, the image processing method further comprises:

sending the left eye image by the asynchronous time warping and the right eye image by the asynchronous time warping to a display respectively, for displaying by the display.

13. The image processing method according to claim 1, wherein the first rendering process comprises performing common process on the left eye image and the right eye image at the same time.

14. The image processing method according to claim 13, wherein the common process includes a rendering operation.

15. The image processing method according to claim 14, wherein the rendering operation comprises one or more of data loading, mapping and sampling.

16. The image processing method according to claim 1, wherein the second rendering process comprises performing prediction and compensation of posture of the left eye image.

17. The image processing method according to claim 1, wherein the second rendering process comprises performing prediction and compensation of posture of the right eye image.

18. The image processing method according to claim 1, wherein by performing the first rendering process on the left eye image and the right eye image, rendering time of the right eye image is accelerated, so that the start of asynchronous time warping of the left eye image is delayed, thus the waste of rendering is avoided, more real-time frames enters a display, and user's dizzy feeling is reduced.

19. An image processing device, comprising a memory, a processor, and an image processing program stored on the memory and executed by the processor, and the processor is configured to execute the image processing program to perform the steps of the image processing method according to claim 1 are implemented.

20. A non-transitory computer readable storage medium in which an image processing program is stored, and the image processing program is configured to be executed by a processor to perform the steps of the image processing method according to claim 1 are implemented.

* * * * *